(12) United States Patent
Eid et al.

(10) Patent No.: US 10,540,910 B2
(45) Date of Patent: Jan. 21, 2020

(54) HAPTIC-BASED DENTAL SIMULATIONRPB

(71) Applicants: NEW YORK UNIVERSITY, New York, NY (US); NEW YORK UNIVERSITY IN ABU DHABI CORPORATION, Abu Dhabi (AE)

(72) Inventors: Mohamad Eid, Abu Dhabi (AE); Peter Loomer, New York, NY (US); Dianne Sefo, New York, NY (US); Georgios Korres, New York, NY (US); Georgios Karafotias, New York, NY (US)

(73) Assignees: NEW YORK UNIVERSITY, New York, NY (US); NEW YORK UNIVERSITY IN ABU DHABI CORPORATION, Abu Dhabi (AE)

( * ) Notice: Subject to any disclaimer, the term of this patent is extended or adjusted under 35 U.S.C. 154(b) by 159 days.

(21) Appl. No.: 15/614,578

(22) Filed: Jun. 5, 2017

(65) Prior Publication Data
US 2017/0352292 A1 Dec. 7, 2017

Related U.S. Application Data

(60) Provisional application No. 62/346,320, filed on Jun. 6, 2016.

(51) Int. Cl.
*G09B 23/28* (2006.01)
*G09B 9/00* (2006.01)

(52) U.S. Cl.
CPC ............ *G09B 23/283* (2013.01); *G09B 9/00* (2013.01)

(58) Field of Classification Search
CPC ................................ G09B 23/283; G09B 9/00
(Continued)

(56) References Cited

U.S. PATENT DOCUMENTS

| 4,368,041 A | 1/1983 | Roup |
| 5,766,017 A | 6/1998 | Nevin et al. |

(Continued)

FOREIGN PATENT DOCUMENTS

WO WO-2008/091434 A1 7/2008

OTHER PUBLICATIONS

Forsslund, J., et al., "A User-Centered Designed FOSS Implementation of Bone Surgery Simulations," World Haptics 2009—Third Joint EuroHaptics Conference and Symposium on Haptic Interfaces for Virtual Environment and Teleoperator Systems, Mar. 18-20, 2009, pp. 391-392.

(Continued)

*Primary Examiner* — Robert P Bullington
(74) *Attorney, Agent, or Firm* — Foley & Lardner LLP

(57) ABSTRACT

Existing haptic-based simulation systems struggle to replicate a realistic experience for dental and dental hygiene students and clinicians. A realistic haptic-based simulator to train periodontal procedures. Realism is accomplished through three distinguished features: (1) a custom grip to attach dental instruments to the haptic device, which enhances the grip experience since learners feel the tactile properties of the instruments (rather than the haptic device stylus), (2) two haptic devices are utilized to simulate haptic feedback with both the dental instrument (dominant hand) and the mirror instrument (non-dominant hand), and (3) a finger support mechanism using parallel manipulation is used for the intraoral fulcrum during probing. The Haptic dental simulator system comprises software and hardware subsystems. The software subsystem comprises of two Graphical User Interface (GUI) windows: the configuration window where an instructor defines periodontal exercises for learners to practice with and a simulation window where periodontal exercises are displayed for learners to interact (Continued)

with. The hardware subsystem includes two haptic devices with grips having the real instruments, and the finger support device.

20 Claims, 9 Drawing Sheets

(58) Field of Classification Search
USPC .......................................................... 434/263
See application file for complete search history.

(56) References Cited

U.S. PATENT DOCUMENTS

| | | | |
|---|---|---|---|
| 7,530,812 B2 | 5/2009 | Chyz | |
| 8,013,853 B1 | 9/2011 | Douglas et al. | |
| 9,011,147 B2 | 4/2015 | Jacquemyns | |
| 2004/0091845 A1* | 5/2004 | Azerad | G09B 23/283 434/263 |
| 2006/0019228 A1* | 1/2006 | Riener | G09B 23/283 434/263 |
| 2009/0035739 A1 | 2/2009 | Alemzadeh | |
| 2009/0245472 A1 | 10/2009 | Pichardo et al. | |
| 2014/0154655 A1 | 6/2014 | Bell et al. | |
| 2014/0248577 A1 | 9/2014 | Tahmasebi et al. | |
| 2014/0356835 A1 | 12/2014 | Montalbano | |

OTHER PUBLICATIONS

Johnson, L., et al., "An Initial Evaluation of the Iowa Dental Surgical Simulator," Journal of Dental Education, Dec. 2000, 64(12):847-853.
Luciano, C., et al., "Haptics-based virtual reality periodontal training simulator," Virtual Reality, Feb. 13, 2009, 13(2):69-85.
Mallikarjun, S.A., et al., "Haptics in periodontics," Journal of Indian Society of Periodontology, Jan.-Feb. 2014, 18(1):112-113.
Moog, "Haptic Technology in Virtual Reality Simodont® Dental Trainer," <https://www.moog.com/markets/medical-dental-simulation/haptic-technology-in-the-moog-simodont-dental-trainer/#>, accessed Aug. 13, 2015, 2 pages.
Ranta, J.F., et al., "The Virtual Reality Dental Training System-Simulating dental procedures for the purpose of training dental students using haptics," Proceedings of the Fourth PHANTOM Users Group Workshop, Oct. 1999, 7 pages.
Rhienmora, P., et al., "Intelligent dental training simulator with objective skill assessment and feedback," Artificial Intelligence in Medicine, 2011, 52(2):115-121.
Thomas, G., et al., "The design and testing of a force feedback dental simulator," Computer Methods and Programs in Biomedicine, 2001, 64(1):53-64.
Wang, D., et al., "iDental: A Haptic-Based Dental Simulator and Its Preliminary User Evaluation," IEEE Transactions on Haptics, Oct.-Dec. 2012, 5(4):332-343.
Welk, A., et al., "Computer-assisted Learning and Simulation Systems in Dentistry—A Challenge to Society," International Journal of Computerized Dentistry, 2006, 9(3):253-265.

* cited by examiner

FIG. 9

HAPTIC-BASED DENTAL SIMULATIONRPB

CROSS REFERENCE TO RELATED APPLICATION

The present application claims benefit of U.S. Provisional Patent Application No. 62/346,320 filed Jun. 6, 2016, the entire content of which is incorporated herein by reference.

TECHNICAL FIELD

The present disclosure relates generally to methods and systems for dental simulation.

BACKGROUND

Over the last decade there has been a remarkable increase in the use of information technology in both learning and training of dental procedures using computer simulators. The use of a dental simulator has proved to increase patient safety and reduce risk associated with human errors by allowing dental students to develop skills more efficiently in a shorter period of time.

In particular, acquiring abilities and skills to perform periodontal procedures takes more than observing patients, diagnosing and managing the disease, but also needs a practical experience of the tactile sensation. Traditionally, dental and dental hygiene students gain such expertise in the laboratory through two stages: first, students train on artificial teeth placed within a manikin head, using real dental instruments, and second, students perform periodontal procedures on real patients under the close supervision of their professors. Existing simulation tools do not allow students to learn about the material properties of the organs (the feel of soft tissues or bone texture).

Dental simulators have been developed both in the academia and the industry. The concept design of a Virtual Reality Dental Training (VRDT) system was introduced in the late nineties to practice cavity preparation. Thomas et al. developed a training system that enables an operator to practice the detection of carious lesions. In recent years, more powerful dental simulation tools have been developed including the Virtual Reality Dental Training System (VRDTS), Iowa Dental Surgical Simulator (IDSS), and 3DDental (no longer available). Several companies have been focusing on developing commercial dental training systems. Simodont™ was developed by MOOG, Inc., and can simulate drilling and mirror reflection. Forsslind Dental System™ was developed to practice dental drilling and wisdom teeth extraction.

Periodontal procedures require clinicians to depend primarily on their tactile sensation, for both diagnostic and surgical procedures. This makes haptic technology ideally suited for periodontal simulators. The PerioSim simulator was developed to simulate three operations: pocket probing, calculus detection, and calculus removal. Wang et al. developed a haptics-based dental simulator (iDental) and presented a user evaluation that included qualitative and quantitative analysis. Results suggested that it is necessary to use 6-DOF haptic rendering for multi-region contacts simulation. Furthermore, a more practical dental simulator must include simulation of deformable body such as tongue and gingival, and simulation of occlusion of tongue and cheek on teeth, etc.

Even though prior work has proven to be a successful tool for faster acquisition of skills and has resulted in overall positive student perception, there remain few challenges. First of all, the quality of user immersion is not sufficient; the users use the haptic device stylus to interact with the simulation environment and do not use real dental instruments. Second, two-hands simulation must be supported to recreate two-instruments interaction experience. Finally, the fulcrum is not realistic since there is no simulation of finger support. General haptic support devices have been developed, but such devices have typically focused on supporting the arm to allow the hand to move freely. Therefore, a system that simulates periodontal procedures both haptically and graphically will be a better solution to increase learners' knowledge/experience level before performing on live patients.

SUMMARY

In some embodiments, haptic-based simulators employ a haptic device where the learner holds a pen-like stylus instead of the real dental instrument, whose virtual representation is shown on the screen, and reproduce tactile sensations in the hand of the operator. Using virtual reality and haptics technologies, the Haptic dental simulator system provides learners with a more realistic experience to replicate real-world diagnosis and/or treatment procedures of periodontal diseases. The learner uses dental instruments attached to the haptic devices via custom grips, interact with 3D virtual models of teeth, gingiva, bone, calculus, instruments, etc., and feel their physical tactile properties with two hands. The learner is also provided a finger support mechanism for the intraoral fulcrum during instrumentation.

Embodiments described herein relate generally to haptic-based simulation systems struggle to replicate a realistic experience for dental and dental hygiene students and clinicians. A realistic haptic-based simulator to train periodontal procedures. Realism is accomplished through three distinguished features: (1) a custom grip to attach dental instruments to the haptic device, which enhances the grip experience since learners feel the tactile properties of the instruments (rather than the haptic device stylus), (2) two haptic devices are utilized to simulate haptic feedback with both the dental instrument (dominant hand) and the mirror instrument (non-dominant hand), and (3) a finger support mechanism using parallel manipulation is used for the intraoral fulcrum during probing.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

FIG. 9: Configuration GUI.

Figure 1:
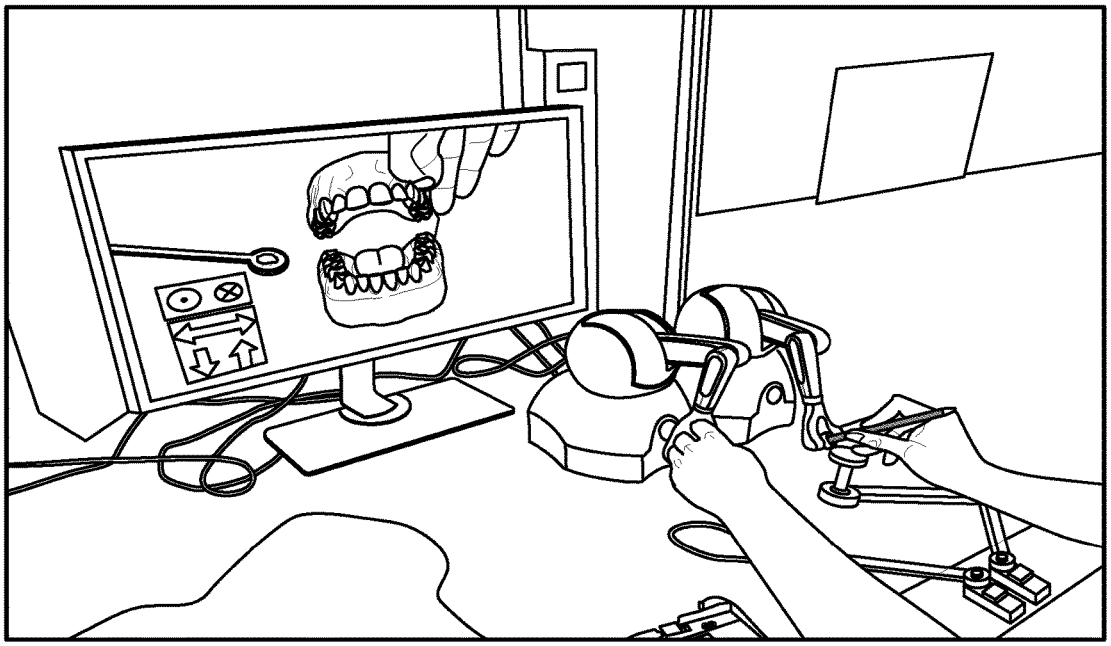
FIG. 1 illustrates a component diagram for the Haptic dental simulator system.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Embodiments described herein relate generally to systems and methods for a realistic haptic-based simulator to train periodontal procedures. FIG. 1 shows an embodiment of a system 100 focuses on creating more realistic interaction by: (1) a custom grip to allow several types of instruments, in different shapes and sizes to be attached to the haptic device—3D models for these instruments are also shown in the virtual environment, (2) supporting two-hands interaction using two haptic devices (one haptic device provides physical interaction between the dominant hand and the dental instrument whereas the other haptic device supports physical interaction between the non-dominant hand and the mirror instrument), and (3) building a finger support device that follows the dominant hand haptic device and provides physical support for the finger when fulcruming on teeth.

System Architecture

One embodiment of a haptic dental simulator system 101 is shown in FIG. 1. The illustrated embodiment the haptic dental simulator system includes a software subsystem 210 and a hardware system 310, a high level example of which is shown in the in the flow chart of FIG. 2.

Software Subsystem

In one embodiment, the haptic dental simulator system 101 includes a software subsystem 210. In one embodiment, the software subsystem 210 is implemented using CHAI3D framework. The software subsystem should, in one embodiment, support haptic and graphic rendering module 220 or multiple points of haptic interaction. The software subsystem should perform efficiently since haptic rendering must be performed quickly, such as within 1 ms (typically C or C++ programming languages are fast enough). The software subsystem 210 should also support multiple haptic interfaces. CHAI3D is an open source set of C++ libraries for computer haptics, visualization and interactive real-time simulation. In one embodiment, a lightweight OpenGL-based graphics engine provides graphics rendering of the virtual environment. Any graphic engines that support haptic rendering can be used. The engine must also be deployable on multiple operating systems platforms for high accessibility. Another reason for selecting CHAI3D for the software implementation is the support for multiple haptic devices within the same stand-alone application.

In one embodiment, an alternative setup, such as for larger-scale usage, would include a real-time interaction where the instructor performs a particular task and asks students to practice the same exercise (such as fulcrum). In one embodiment, the simulation application will read a special file to create learning tasks. This special file is created through the configuration application and could also be retrievable from a server, in order to achieve large scale teaching and/or e-learning. Immediate feedback may be provided by graphics to inform user of correct angulation, adaptation, and force applied.

A Environment Simulation module 230 maintains the graphic and haptic models that comprise the dental training environment, and synchronizes haptic device interaction. In one embodiment, database components are associated with the Environment Simulation module. For example three databases: Quality of Performance (QoP) database 231 that stores all data exchanged between the trainee and the simulation environment to evaluate the student performance, the Haptic Models database 232 contains the physical properties of objects populating the simulation environment, including the stiffness, static friction, and dynamic friction of the gingiva, teeth, calculus, tongue, etc., and the Graphic Models database 233 saves the 3D geometry models and scene graph for the simulated environment. Preferably, these graphic/physical properties are captured via high-resolution visual/haptic scanning devices to create realistic and accurate physical interaction with the simulation environment. Such properties may include, for example, the graphic/physical properties of human tissues (gingiva, teeth, tongue, cheeks, lips). There are also other objects that may be accurately modeled such as calculus formation and gingiva deformation).

The haptic dental simulator system 101 configures the simulation environment by controlling the graphical/physical properties of the simulation via a Graphical User Interface (GUI) displayed on a display 120. A GUI module 240 may be utilized to communicate with and/or to control the display 120.

Figure 10A:
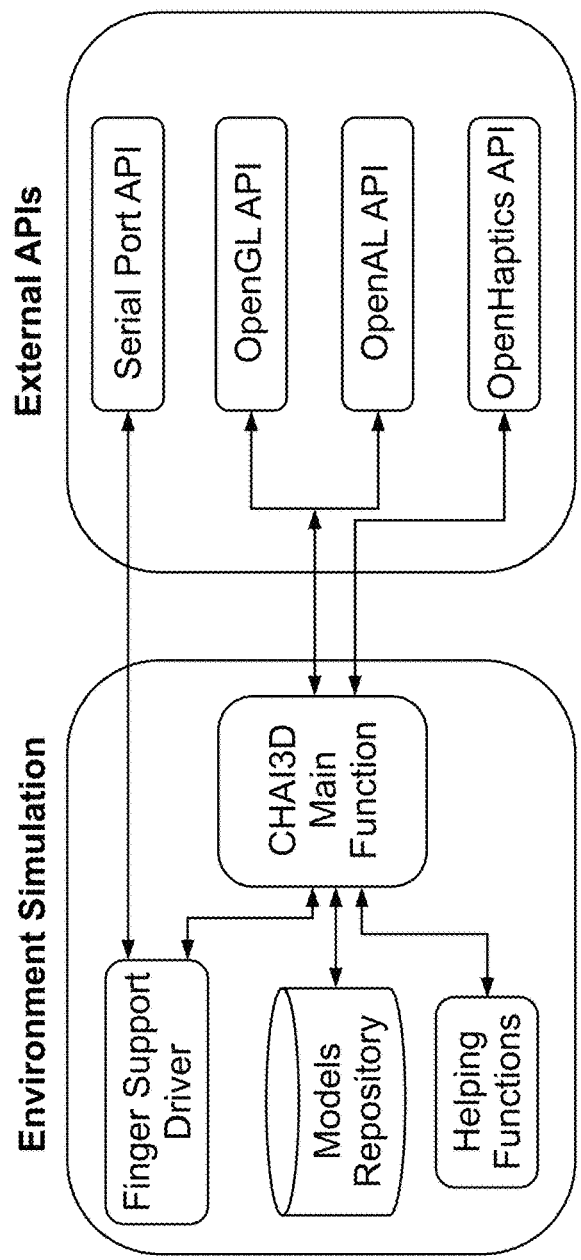
FIG. 10A: Implementation architecture for the software simulation.
Figure 10B:
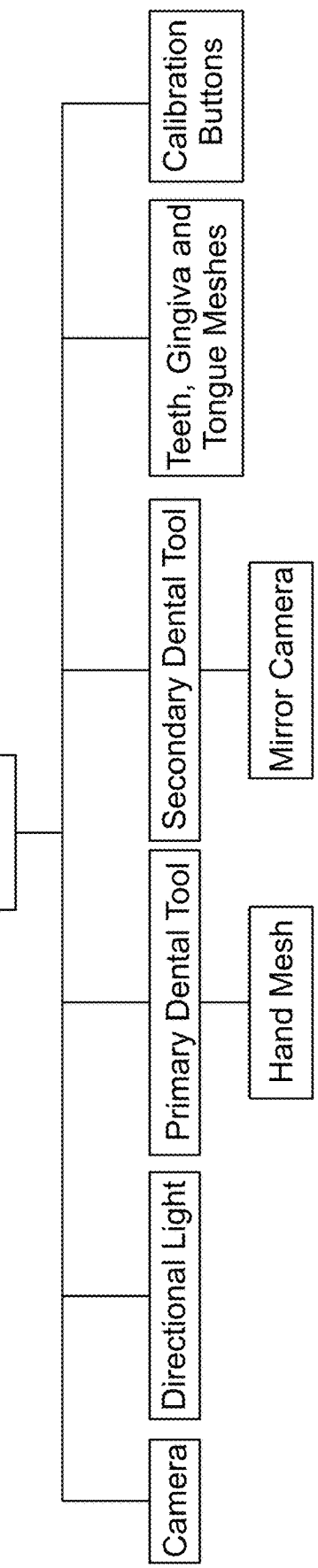
FIG. 10B: Simulation Component's Environment.

The QoP database 231 stores data about the user performance (such as trajectory traces, task completion time, error rate, ergonomics of performance). The Haptic Models database stores the haptic properties information about all objects populating the simulation environment (see FIG. 10B), for example stiffness, friction, and haptic texture. The graphic models database stores the mesh files for all objects populating the simulation environment. The QoP database 231 can store information for use by both the trainer and the trainee as feedback will depend of the periodontal procedure and may include: probing procedure, such as 1) maximum depth measured for each sector and for each tooth, 2) task completion time, and 3) ergonomics practices for various tasks. For embodiments with multiple haptic point interaction to simulate a haptic object, then the number of times that the trainee didn't use the correct angle for the tool and touched surfaces that shouldn't have can be tracked, stored and/or reported. Also, if the trainee used more force than required, which may have caused a bleeding event in a real-life procedure. The QoP database 231 may also store information relating to the scaling procedure, such as percentage of calculus removed from every tooth and task completion time.

In one embodiment, the user's actions are recorded and may be compared to a threshold or preferred amount. For example, where implementing multiple haptic point interaction to simulate a haptic object, then the number of times that the trainee didn't use the correct angle for the tool and touched surfaces that shouldn't have can be tracked. Also, if the trainee used more force than required or otherwise performs other than by a predetermined way, the result can be recorded and or communicated. For example, where more force was used than required (as indicated by a predetermined value) which may have caused a bleeding.

Further, in one embodiment, the Audio/Visual/Haptic 220 rendering module renders auditory, visual, and haptic interactions between the trainee and the simulation environment. This module may operate as known in the art, for haptic rendering may be based on rendering a haptic field to simulate surface contact when the probe is inserted between the teeth and the gingiva.

Hardware Subsystem

Figure 2:
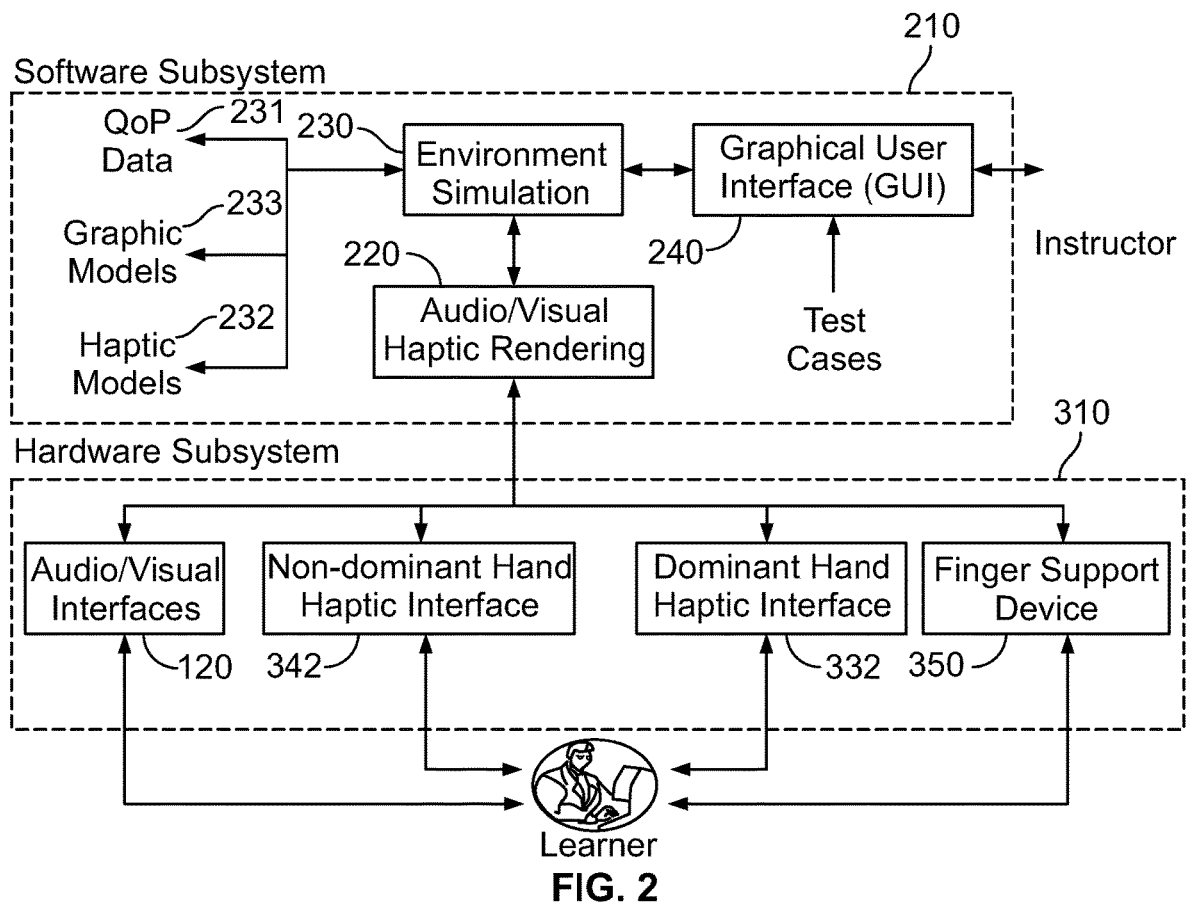
FIG. 2 illustrates a Haptic dental simulator implementation.

FIG. 2 illustrates one embodiment of a current Haptic dental simulator system 101 is shown in FIG. 2. Audio/Visual interfaces 120 provide auditory and visual interactions with the trainee (such as speakers and microphones for auditory input/output and a screen for visual display). In one embodiment, one or more haptic interfaces 330 are provided. For example, hand haptic interfaces configured for interaction with and by a user's hand. In one particular embodiment, the hand haptic interfaces include a non-dominant hand haptic interface 342 simulates physical interactions with a dental mirror 344 whereas a dominant hand haptic interface 332 renders force interactions with the dental instrument 334. For one embodiment, a grip 360 is designed to attach dental instruments/mirror 334/344 to the haptic devices 342/332 so users have a realistic experience handling physical instruments. Finally, a finger support device 350 is built to support the trainee finger while performing a periodontal task (for instance while performing calculus removal).

Figure 3:
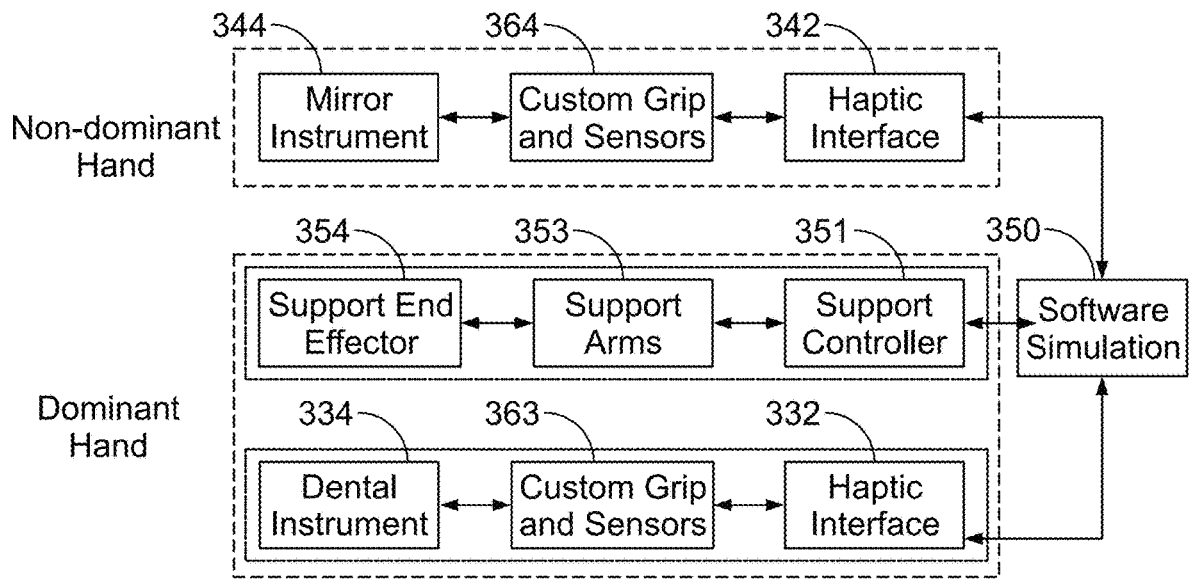
FIG. 3 illustrates a block diagram for the Haptic dental simulator system.

FIG. 3 is a block diagram illustrating further details of one embodiment of a hardware subsystem 310. In the illustrated embodiment, three parallel streams of data are exchanged between the hardware 310 and the software simulation subsystem 210. The dominant hand haptic interface 332 captures movements and provides force feedback for the dominant hand (dental instrument 334), whereas the non-dominant haptic interface captures movements and provides force feedback for the non-dominant hand (mirror instrument). The finger support device 350 acquires the dominant hand haptic interface 332 position from the simulation software and moves its end effector 354 underneath the dominant hand position (so when the learner wants to rest their finger, the end effector will be right beneath it).

In one implementation, there is one haptic interface for each trainee's hand. Thus, an series of haptic interfaces may be provided in pairs, as a left-hand interface and a right-hand interface (dominant/non-dominant). Further, while the haptic systems described herein are framed in terms of a system with three degrees of freedom, the system could use more, such as six degrees of freedom input. Generally, the systems could use: a) sensors to capture user performance such as force sensors on the tool grip 360 to check if the trainee holds it correctly or posture sensors to measure the body posture, b) actuators that provide users with physical feedback about the simulation system. Feedback may be provided in two ways, independently or together. There is a "virtual" feedback which is a force applied to the trainee's hand through the haptic device and which depends on the haptic properties of the object that is being touched, e.g. the tooth. There is also a "real" feedback through the support system, where the trainee rests his hands on. Its texture and shape resemble a real tooth. The feedback to the manipulated object may result in graphical and/or haptic deformation or location manipulation.

Graphical User Interface

The display 120 may be one or more displays, such as a LCD monitor, television monitor, portable electronic device, or projected display screen. In one embodiment, one or more aspects of the system may be run "remotely", that is run on a server or remote device from the GUI. A predefined set of common configurations/tasks are created and stored as test cases for easy retrieval and setup. In one embodiment, the display 120 may be a typical computer monitor or video screen, in another embodiment, the display 120, may include a virtual reality (VR) head mounted dedicated system, such as that sold as the Occulus Rift® can be used. In another implementation, a non-dedicated system such as the use of a smart phone in conjunction with a head-mounted bracket. In particular embodiments, a more realistic VR system may be used that provides the user with a sense of depth. As for the haptic interfaces, mobile exoskeleton haptic interfaces can be used with wireless communication to the simulation software. Another possibility is to use contactless haptic such as using ultrasonic, laser, or air-jet stimulation.

Grip for Haptic Interfaces

Figure 4:
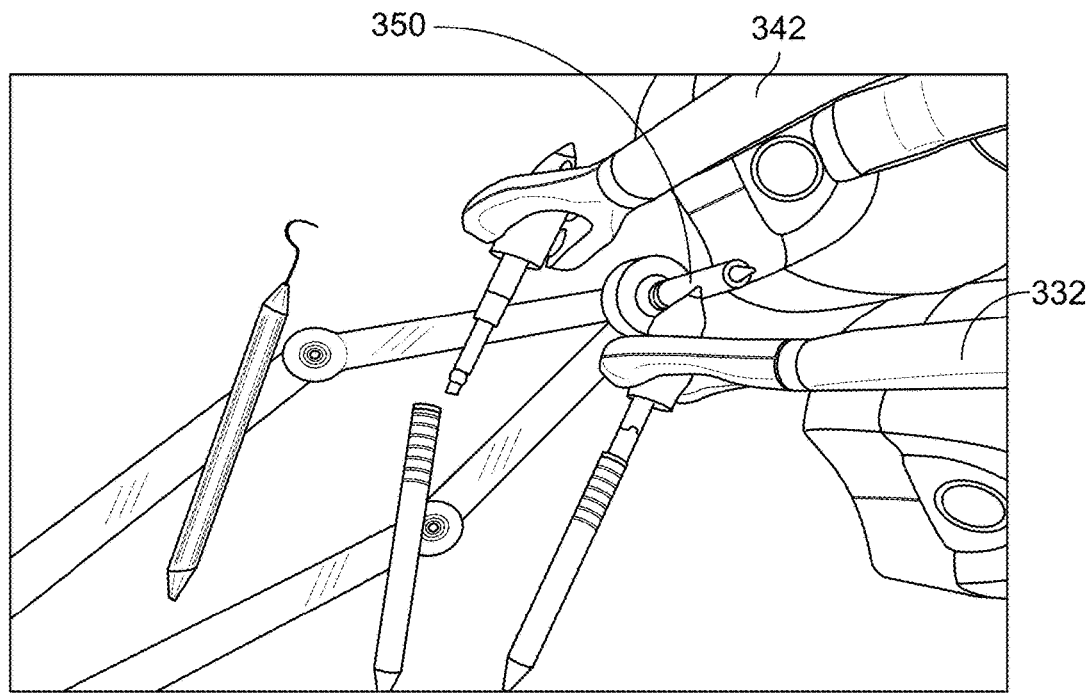
FIG. 4 illustrates a custom grip for the haptic devices.

In one embodiment of the Haptic dental simulator system 101 is to provide dental and dental hygiene students with realistic tactile experience handling dental instruments by designing a grip 360 that connects the haptic interface to real dental instrument. For example, a Geomagic Touch® effectuator can be used. Alternatively, the dominant hand device 332 and/or the non-dominant hand may utilize a "fixed" effector such as a pen-like end effector. Thus, in one embodiment the instrument 334/344 is connected directly as an integral part of the haptic interface 332/342 or, alternatively, one or more of the haptic interfaces 332/342 engage, such as removably, with the instrument 334/344 through the grip 360. A dominant hand grip 363 and a non-dominant hand 364 maybe utilized. A demonstration of an embodiment with a grip 360 allowing for interchangeable instruments 334/344 is shown in FIG. 4. In one embodiment, the grip is an actual, physical dental tool cut and attached to the haptic device. In a preferred embodiment, the dental tool 334 provides the same feel as the tool used with a patient so as to provide the exact same feel with the trainer as would be used by a dentist in actual performance of a procedure.

Finger Support Device

In one embodiment, the haptic dental simulator system 101 includes a finger support 350. A user, in order to perform the probing and the scaling procedures are using some of their fingers to touch the patient's teeth to support their entire hand. Thus, in one embodiment, the finger support 350 provides a physical structure to mimic the support provided to a user's hand by a patient's body, specifically teeth, gums, or other parts of the head, mouth, and oral cavity. To always follow the dominant hand of the trainee (which holds the primary tool) to provide support, so the trainee can apply the necessary forces. The support system 350 follows the arc of the teeth, so it's emulating the shape of the denture.

Figure 5A:
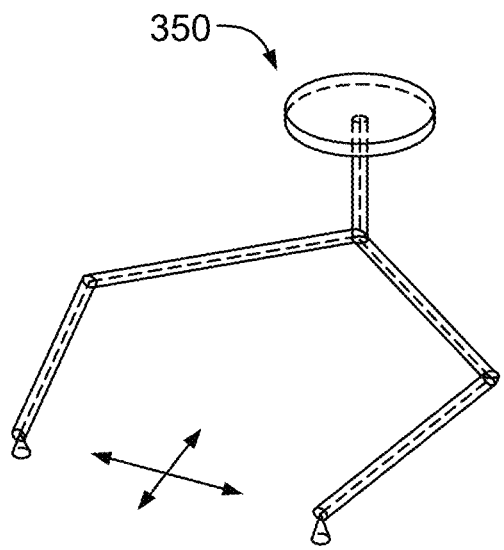
FIG. 5A illustrates a finger support 3D model.
Figure 5B:
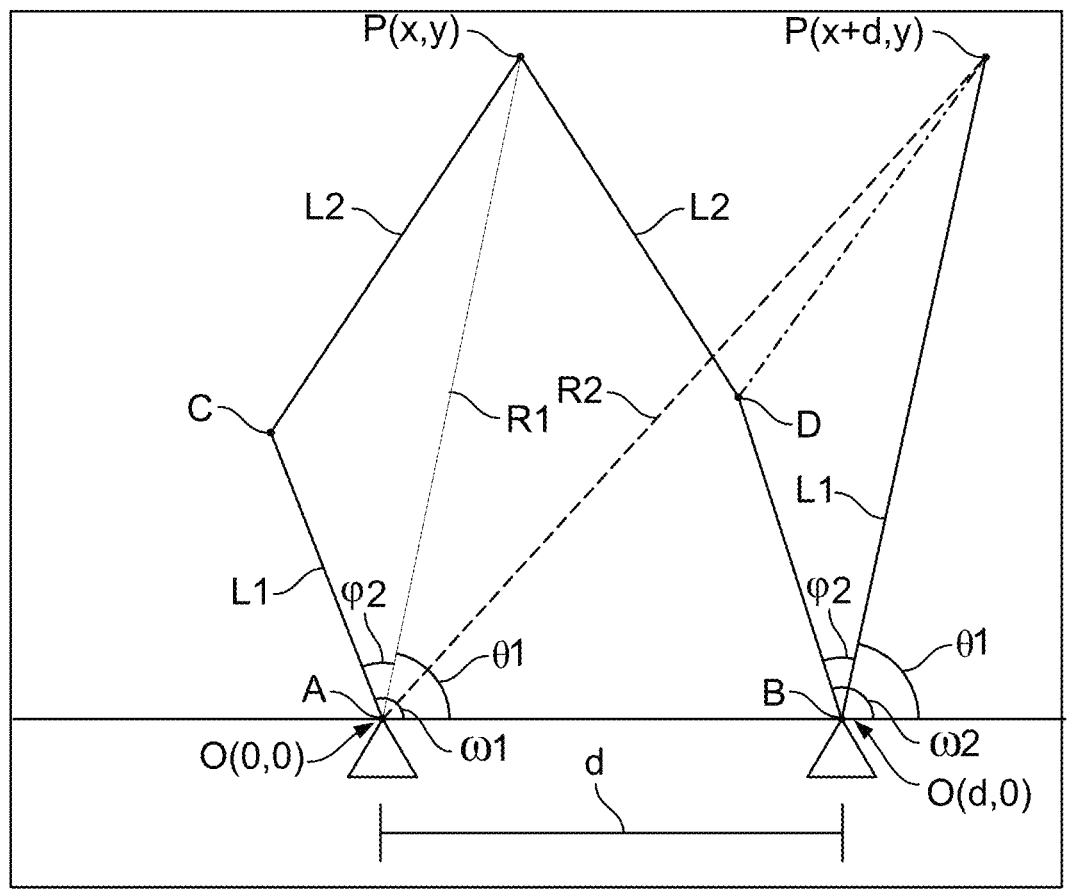
FIG. 5B illustrates the inverse kinematics problem.

As one embodiment, FIGS. 5A-B illustrate a two-degrees-of-freedom parallel robot designed to provide finger support for the trainee as he/she performs periodontal procedures (a 3-D model is shown in FIG. 5A). The finger support device 350 uses two servo motors, each controlling the movement of one robotic arm that are connected together through the end effector base. The finger support device 350 receives position data (x,y) from the dominant hand haptic device, calculates the angles needed to move the end effector to that position, and instruct a movement system, such as a plurality of servo motors, to generate the required torques to make the actual movements. In one embodiment, the finger support 350 is always aligned underneath the haptic device end effector. The inverse kinematics analysis involves determining the angles $\psi 1$ and $\psi 2$ of rotation of the movement system, such as stepper motors A and B in order to move the end—effector to a general position P(x,y), as shown in FIG. 5B. An alternative embodiment may, for example, utilize DC motors or stepper motors. The finger support 350 can also be designed in different ways (number of segments and degrees of freedom for each).

Figure 6A:
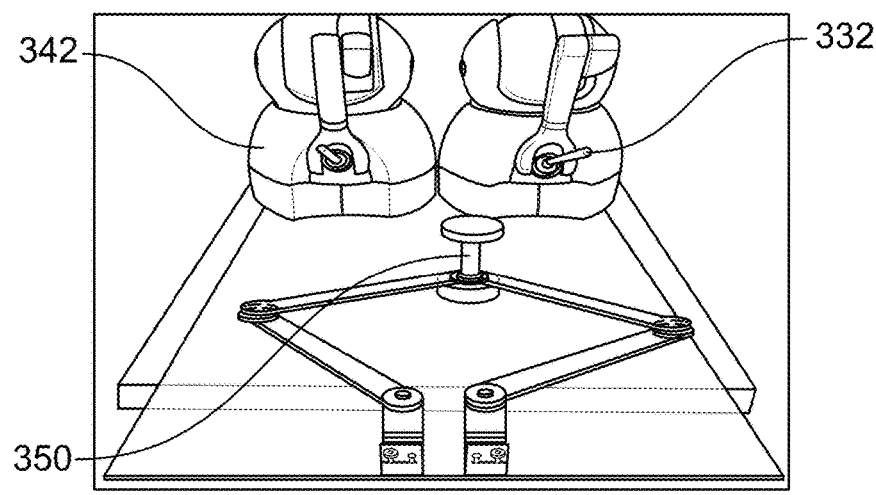
FIG. 6A illustrates a 2 DoF parallel robotic device for finger support.
Figure 6B:
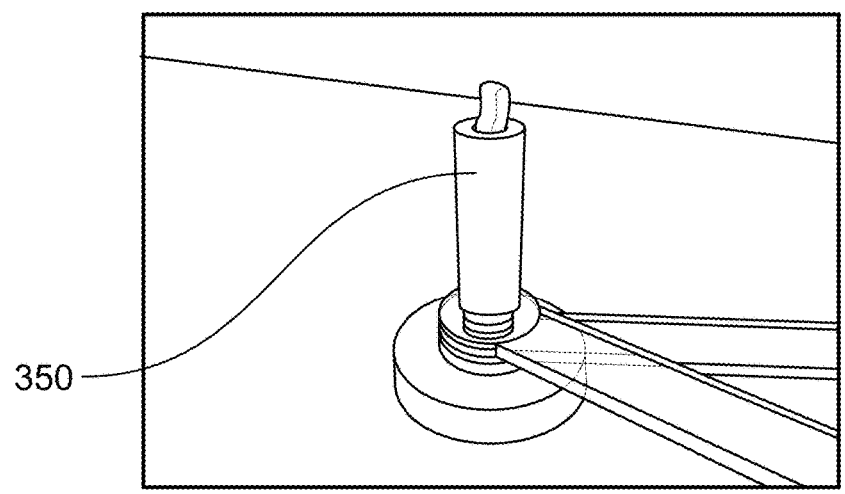
FIG. 6B illustrates a finger support end effector with a tooth model attached.

FIG. 6A illustrates a 2 degree of freedom parallel robotic device for finger support 350. In one embodiment, the finger support end effector 350 is customizable in three ways, as shown in FIG. 6B: (1) the elevation of the support compared to the haptic interaction workspace, i.e. the position of the dominant hand interface 332 and/or the non-dominant hand interface 342 is adjustable, (2) a variable offset along the xy-plane is possible to provide the most convenient handling, and (3) an end effector 351 having a shape that can be customizable (for instance connecting a real tooth or teeth, a flat rectangular/circular surface, or a gingiva-like surface). It should be appreciated, the finger support system 350 benefits from being customizable, because the users are different, for example someone could have very large fingers compared to the average. The calibration of the support system should ideally just be done once at the beginning. Further, the end effector 351 may be configured to communicate with the overall system to provide information, such as what the end effector 351 is, for example identifying the type of tool. The first two customizations are done in software via the configuration GUI whereas the third one is possible by physically replacing the end effector with the appropriate form. The implementation of the finger support device is shown in FIG. 6.

3D Modeling

Figure 7A:
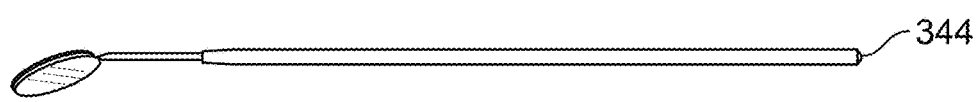
FIG. 7A illustrates mirror instrument.
Figure 7B:
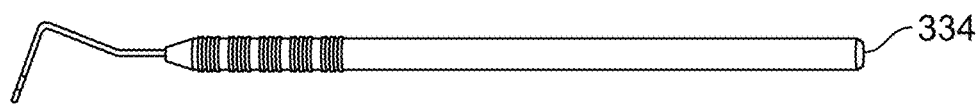
FIG. 7B illustrates periodontal probe.
Figure 7C:
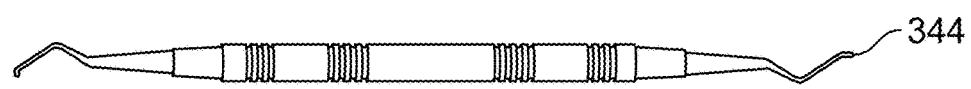
FIG. 7C illustrates periodontal scaler.
Figure 8A:
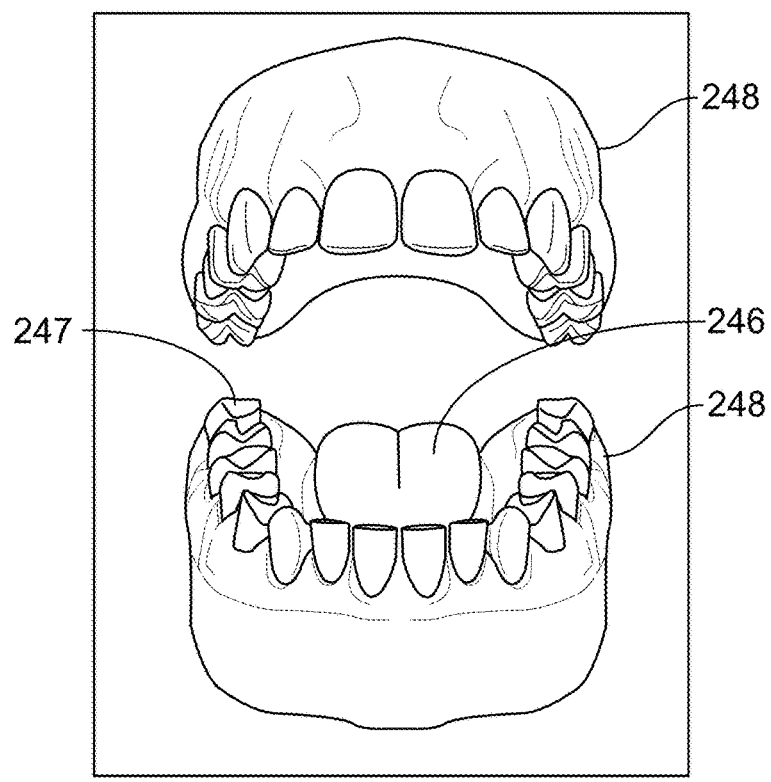
FIGS. 8A and 8B illustrate models for the top and bottom gingiva and all the teeth FIG. 8A, and a simulation of calculus FIG. 8B.
Figure 8B:
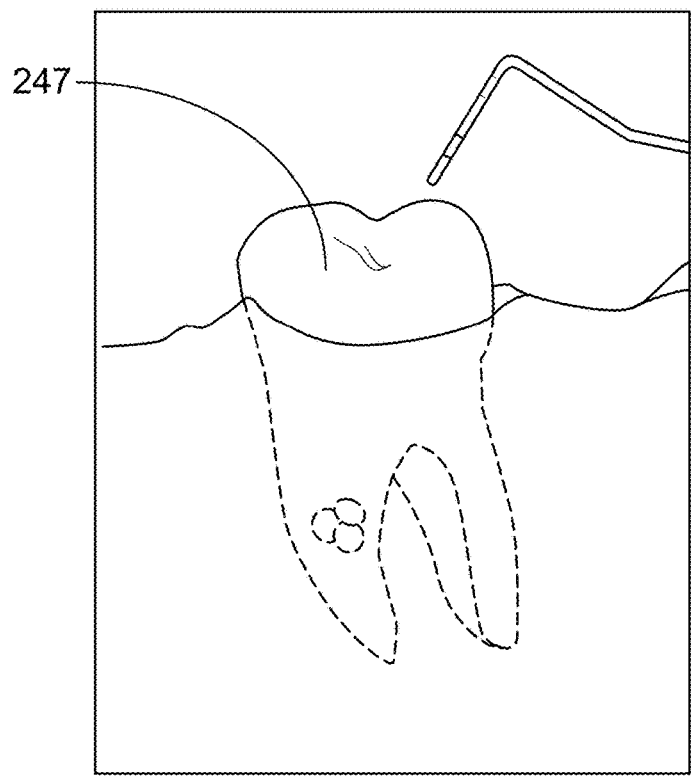

Models for the objects that populate the simulation environment are created, namely the dental instruments, upper and lower teeth 247, gingiva 248, and calculus. For example, in one embodiment, the models may be generated by scanning (such as high-resolution scanning) with a 3-D scanner. FIGS. 7A-C shows the 3D models for the periodontal probe, the periodontal scaler, and the mirror instrument. FIG. 8A shows the 3D model for the top and bottom gingiva 248, tongue 246, and all teeth 247. Finally, FIG. 8B demonstrates an example of calculus modeling.

One embodiments relates to a data-driver haptic modeling where an instrument is utilized to measure the physical properties of the human organs used in the simulation (teeth, gingiva, tongue, etc.). This provides a higher level of realism for the haptic interaction. In one embodiment, the system comprises a six degrees-of-freedom force sensor (3 force and 3 torque) and accelerometer.

Configuration Software

The haptic dental simulator system 101 provides, in one embodiment, an easy-to-use graphical user interface for display on the display 120 that enables instructors create customized training sessions for students. One implementation is show in FIG. 8, the GUI has five groups of configurations: teeth configuration (existing/missing), gingiva configuration (color and inflammation properties), probing sections configuration (location and depth of pocket), calculus configuration (enable/disable, severity, location, etc.), and other properties (any future developments such as tooth mobility simulation). In one embodiment, a user GUI is intuitive and does not present a barrier to use. For example, drop-down menus that allow the selection of options or different training scenarios. Such training scenarios can have default values for all the five configuration groups. Instructors can easily create variations of these default configurations.

Simulation Software

Figure 9:
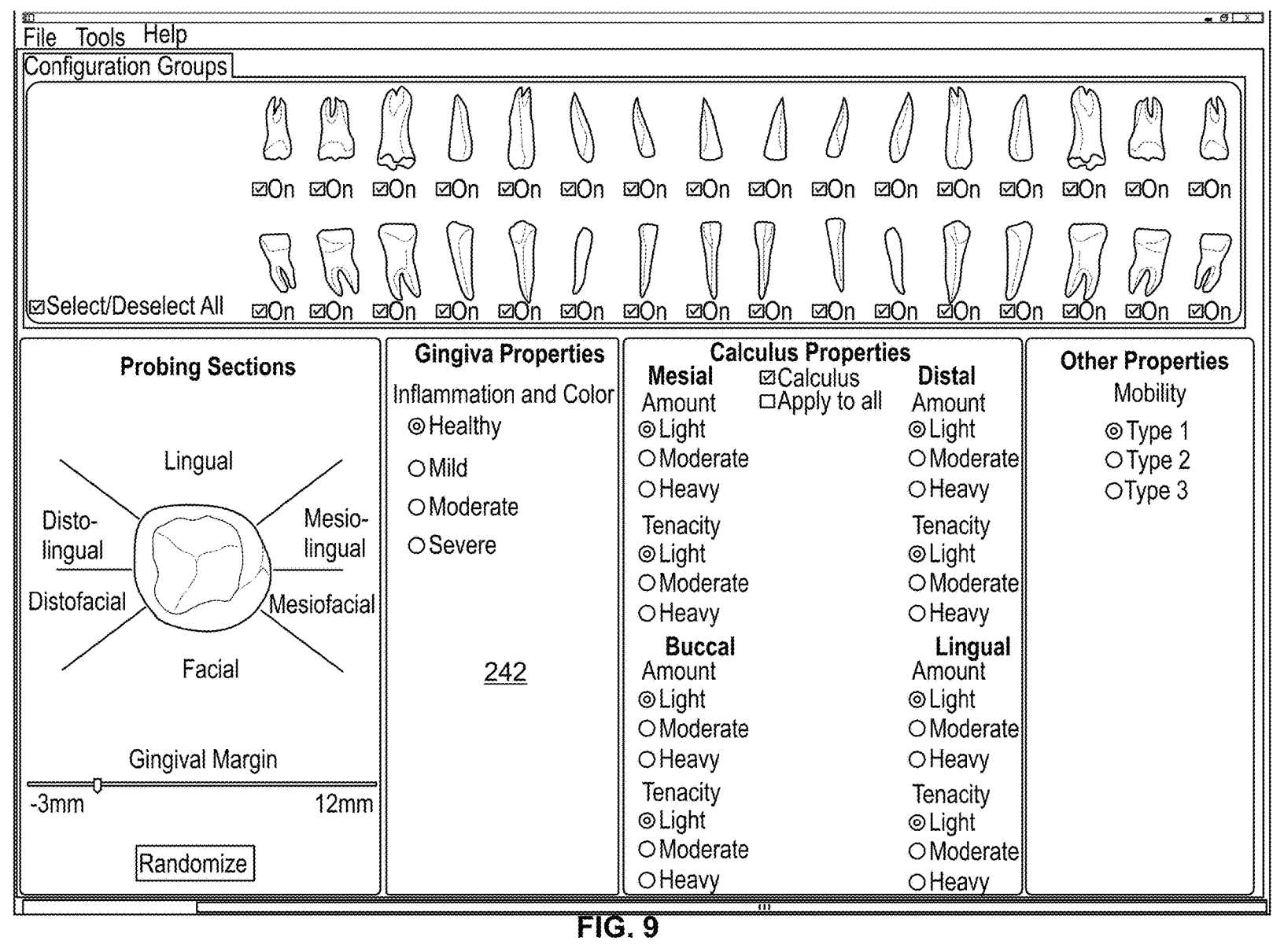

One implementation architecture for the simulation software is shown in FIG. 9. The CHAI3D main function maintains the simulation environment by interacting with various other components for haptic, audio, and visual rendering. The CHAI3D functions block contains predefined functions that are utilized to create the scene's camera and light, and to load the various 3D meshes such as the teeth, gingiva, tongue, and tools (models may be stored in a separate repository as shown as repository GUI 242 in FIG. 9).

Another example of a helping function is to find the vertices with the minimum and the maximum (x,y,z) coordinates in a mesh. It's used to find the min and the max (x,y,z) coordinates of a 3-D model, for example the model that includes the lower teeth. If the min and the max coordinates are known, then one can associate a plane that stretches between these values. This plane has a texture of the lower denture applied on it. For example, the areas of the teeth can be portrayed as black, while all the rest is white. So then, the support system can check the color value of the plane's pixel which corresponds to its 3D position, in order to see if it is permitted to move there. The support system should only follow the arc of the teeth, so only when it gets a black color value, it will move there.

Note that the arrow from the meshes to CHAI3D main class (FIG. 9) is bidirectional because the gingiva model is loaded and then manipulated to create the various pockets. These models are also assigned haptic properties (stiffness, static and dynamic friction) so they can interact within the haptic rendering. In embodiment, the finger support is in communication with the software system, for example wirelessly or wired, such as by a serial port connection to update the position of the finger support end effector. The driver receives the (x,y) coordinates from the primary haptic device and then maps and updates the position of the end effector of the finger support device, making it follow the movements of the user's hand.

In one embodiment, the CHAI3D main function maintains the simulation scene using a node system (FIG. 10), where the world node is the root node, and every child node is rendered in the scene through the OpenGL rendering API. Some meshes are also associated with audio buffers and the primary dental tool with an audio source, resulting a playback of specific sound effects, provided by OpenAL, when there is an interaction between these models and the tool, for example when the probe tool is touching the teeth. Haptic rendering is implemented using OpenHaptics API where the radius of the tools' haptic interaction point is set in order to establish the desirable rendering precision based on the virtual "finger-proxy" algorithm developed by Ruspini and colleagues, where the virtual proxy simulates the physical tool handled by the user.

In one embodiment, the VR display will help the trainee get a better depth perception, but otherwise the virtual application is the same.

Evaluation Study

Experimental Setup and Test-Bed

A qualitative experimental study was done to evaluate different functionalities of the Haptic dental simulator prototype. The evaluation study consisted of two parts: evaluating the hardware subsystem and the software subsystem. Both hardware and software for the haptic device were examined following a series of features outlined for assessment. The subjects were required to conduct a periodontal probing examination to explore the pocket depth of two mandibular posterior teeth for measurement. They also interacted with the GUI for the configuration application. Through user evaluation, the "realism" to a user of the simulation of periodontal instrumentation for dental training was determined.

Haptic Interface: Grip, Workspace, Degrees of Freedom

The first hardware aspect to assess was the use of the real dental instrument handle instead of the haptic device stylus. Initially, the users explored the simulation environment by holding the haptic device stylus and perform a probing task. Afterwards, the stylus is replaced by the dental instrument via the grip. The same task was performed holding the new grip. The exploration procedure was conducted with only one haptic device for the dominant hand. Moreover, the testing enquired if a Geomagic Touch® workspace (160 W×120 H×70 D mm) and the permitted rotation (~315°) are large enough to accommodate periodontal procedures simulation, and if a haptic device with 6-DOF force feedback is required.

A real instrument grip was considered more realistic and comfortable. However, attaching the real instrument has increased the overall weight of the grip, so, in one embodiment, must be compensated by the software. The workspace was large enough to work on every tooth in the human lower and upper jaw. The permitted rotation was restricting. The 300° rotation of the handle needs to be moved from current location on haptic device to allow for +/−150° per direction of use. The 6-DOF force feedback was not required for the probing procedure but might be desired in the scaling procedure.

In one embodiment, the haptic device has a small cog in its stylus that restricts a 360 degree rotation, for example restricting movement to 300 degrees, in one embodiment 150+/− degrees from a resting or neutral location. In one embodiment, the stylus may be wirelessly connected.

Use of Two Haptic Devices

The second hardware feature investigated was whether using two haptic devices, the dental instrument in the dominant hand and the mirror tool in the non-dominant tool, provides an added value to the user experience. The users in the study were asked to perform the same exploration as before twice, the first time using only one haptic device and the second time using both devices. The users were also asked about the difference between left and right-handed users.

The result of the study was that the users felt that the two haptic devices simulation served two purposes: (1) to provide visual access to difficult to see areas and (2) to move the patient's tongue and cheeks in such a way as to not hinder the probing procedure. The left and right-handed users would naturally need to have a different device for their dominant hand, so the simulation software should include an option to assign the two haptic devices to different roles. Furthermore, the camera positions must be mirrored to accommodate for the two kinds of users. The users reported an issue when working with two devices: that the tips of the Geomagic Touch devices were colliding when they were placing the tools very close to each other. To overcome this, the system can utilize programmatic translation of the haptic interaction points of the haptic devices further away from each other or replace the entire grips of the Geomagic Touch which might be more challenging.

In one embodiment, the haptic interaction point of the non-dominant hand's haptic device is transferred a few (such as 1-10) millimeters in front of its end-effector, so it won't collide with the dominant hand's haptic device. Thus, the virtual haptic models will collide first (inside the simulator, and the user will push them apart), before the actual styluses collide in the real world environment.

Finger Support Device

The objective of this test is to assess how closely the finger support device follows the movement of the user's dominant hand and if it should follow a pre-defined trajectory or be able to move in the entire area of the haptic interaction workspace. Also, the calibration, geometry and texture of the end-effector are also examined.

The users felt that the robotic arm follows accurately the user's movements, but it must follow the fulcrum finger and not where the user holds the tool. At the time of testing, the support device could reach any position in the haptic interaction workspace, which they thought was not necessary and that it could only follow the trajectory arch of the teeth. The end-effector was a 3D-printed cylinder of plastic material. It could be improved by changing it to a rougher material, making it smaller and having sharp edges so it feels like a real tooth to the user who will be resting her/his finger on. Finally, in order to provide support for upper and lower jaws, the users' recommendation was to implement a third motor to adjust the height of the finger support end effector or to change the end effector shape to provide an appropriate place for fulcruming when the user is working on the upper jaw.

As for calibrating the finger support device, the users felt that is too complicated to calibrate the end effector in the position they wanted. One reason for this was the absence of depth perception in a 2D screen. Consequently, the embodiments utilizing a 3-D environment, such as virtual reality with depth perception, will implement multiple camera views for the calibration (the top, side, and front views) to give a better perception of the position of the instrument model against the immovable teeth model. Also, in one embodiment, the translation step size should be smaller to have finer control of the calibration.

3D Models

The first component of the simulation software evaluated was the quality of the 3D models. The following 3D models were examined by the users: teeth, gingiva, tongue, dental instruments, and dominant hand. One or more of these models may be used. Further, additional embodiments may include models for bone, probe (Williams), mouth mirror, floor of mouth, lips, cheek, palate, oropharynx, explorer (EXD11/12), universal curette (C13/14), area specific curette (G3/4), area specific curette (G11/12), area specific curette (G13/14), sickle scaler (H5/33), sickle scaler (204S), head, body, and clinic. Users were asked if the details of the models, both graphically and haptically, are satisfactory. About the haptic rendering quality, the users probed and felt the equivalent haptic properties. For the graphic rendering, the 3D modeling software 3D Studio Max was also utilized, in order to get a better understanding of the models graphic details.

Based upon the testing, in one embodiment simulations of oral components, such as the teeth, should have high stiffness and low friction, the gingiva should have low stiffness and low friction. The low friction in both cases is because of the saliva that exists in the oral area. In one embodiment, the simulation may include a setting for friction value, such as a lower friction to simulate saliva. Then Chai3d makes adjustments based on this value to the resistance/feedback felt to the user by the haptic device. Testing further suggested the use of two different models for the teeth, where one of them would be only rendered graphically and the other haptically. The haptic model would be slightly smaller. The purpose of this would be to eliminate the scenario where the tool is getting stuck between the teeth, since the teeth would get smaller so the gaps between them would get larger. The 3D models of the teeth, may in one embodiment, have some points where the teeth are touching. Further, in some embodiments, the haptic device also is being represented by a single interaction point. Sometimes, the interaction point would get stuck when it was colliding at these exact points where the teeth are colliding. So, embodiments using the haptic model as smaller, the teeth won't touch each other and the interaction point will be able to move around them freely.

As for the tongue and cheeks models, one embodiment includes deformable modeling so that the mirror instrument can handle them realistically (in the current implementation tongue and cheeks are modeled as rigid objects). Preferably, the soft tissue should be a deformable object that follows the laws of physics. So, for example, the user could push the tongue to the left using his haptic tool. The base of the tongue is attached to the throat, but the tip of the tongue should move to the left. At the same time, its form should change. These models should also have low stiffness values to represent soft tissue, like tongue, cheeks.

Users noted that the probe model was not as realistic as it should, since it does not have accurate horizontal lines to measure the pocket depth. Furthermore, the gingiva model should also include an underlying bone structure, which would be shown if transparent mode is to be used for educational purposes (such as to show the student the various pockets). Finally, even though the hands models looked realistic, the users suggested to dynamically animate them to simulate, for instance, finger movements. The hands models could get data from the tool sensors (which show if the user holds the tool correctly) to show the fingers positions.

Configuration Graphical User Interface

The users performed a cognitive walkthrough to inspect the configuration GUI. It was concluded that the GUI should be simple, all the options and parameters in one tab. Moreover, preset test cases must be implemented (with drop down menus for example to load these test cases) to facilitate quick composition of learning tasks. The users also suggesting extra options such as select/deselect all buttons and/or functionalities.

One-to-one Correlation

The one-to-one correspondence between the real and the virtual world is also examined with the users. That means that if the user moves the instrument grip 1 cm in the real world, then the corresponding virtual model will also move precisely 1 cm in the same direction. One embodiment, the system also incorporates a calibration system for the finger support device implemented through software. Some buttons in the simulation scene translate the support device, for example in the case that the user has smaller hands than the average. The users were questioned about the usability of this system too. The users thought that the one-to-one correlation system is realistic, since trainees should learn to perform in exact dimensions and not scaled ones.

Probing Procedure

Figure 11A:
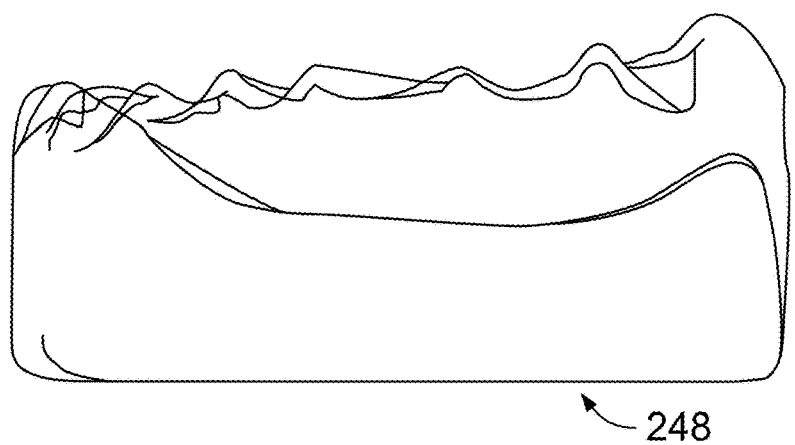
FIG. 11A-11C: Various pocket configurations.
Figure 11B:
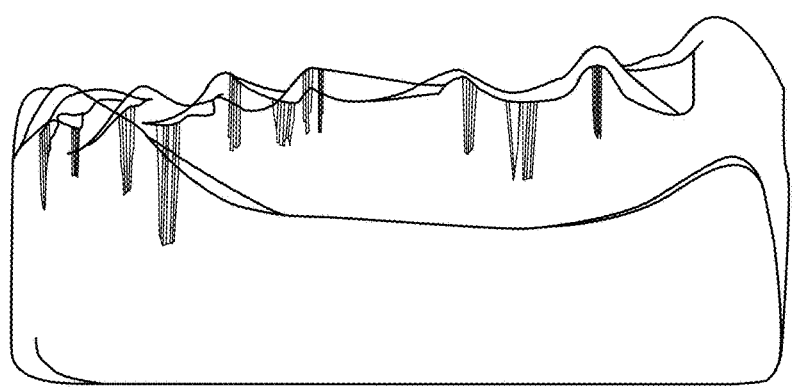
Figure 11C:
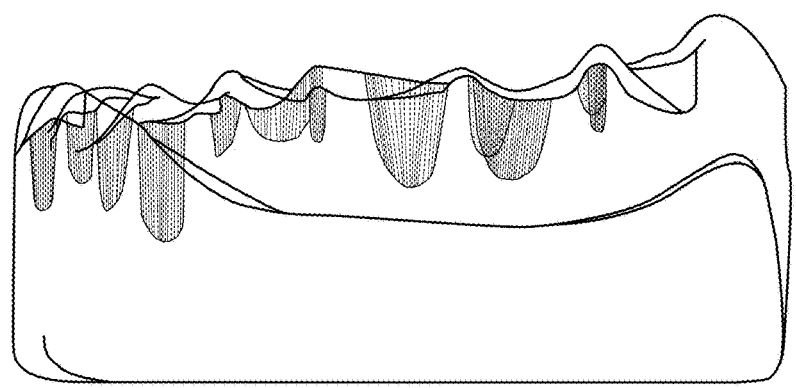

Three probing tasks were created to simulate various pocket sizes/depth. FIGS. 11A-C illustrate simulated gingiva 248. All tasks involved manipulating the lower left quarter of the gingiva. The first configuration simulated a healthy (no pocket) gingiva probing (FIG. 11A). The second configuration comprised pockets in the various sectors with 2 to 8 mm depth with abrupt cavities (FIG. 11B). The third configuration used the same pocket properties except that cavities were smoothed up (FIG. 11C). The users found that the third configuration was the most realistic because the pocket contour should be smooth and gradually change its value. Also, the pocket should be included in a whole sector, not just a portion of it as it happened in the first configurations. Furthermore, the gingiva model should have appropriate dynamic friction values so the user could feel the probing tool sliding inside it. But the most important feature to add is rendering a haptic "field" to simulate haptic feedback as the probe is inserted in between the probe and the teeth/gingiva. A translucent gingiva setting can be used to allow a user to visualize subgingival actions.

Sensors

In one embodiment, sensors can be placed on parts of the system. For example, in one embodiment, force sensors are placed on the grip to identify proper grasping of the instrument. The sensors cannot overlap, but would need to cover enough surface area to allow for the user to roll the tool with fingers when in use. Each sensor will have pressure thresholds to help determine appropriate movement and 3D hand models will display to replicate the user's grasp and provide visual feedback. In one embodiment, the haptic device will be used without gloves to allow for proper readings from the sensors. A sensor may also be added to the end-effector of the support system to monitor finger rest use. Other sensors that can be utilized include motion sensors (for the body posture and hands movements), microphone to capture voice commands, biometric sensors for user authentication.

Computer System

Figure 12:
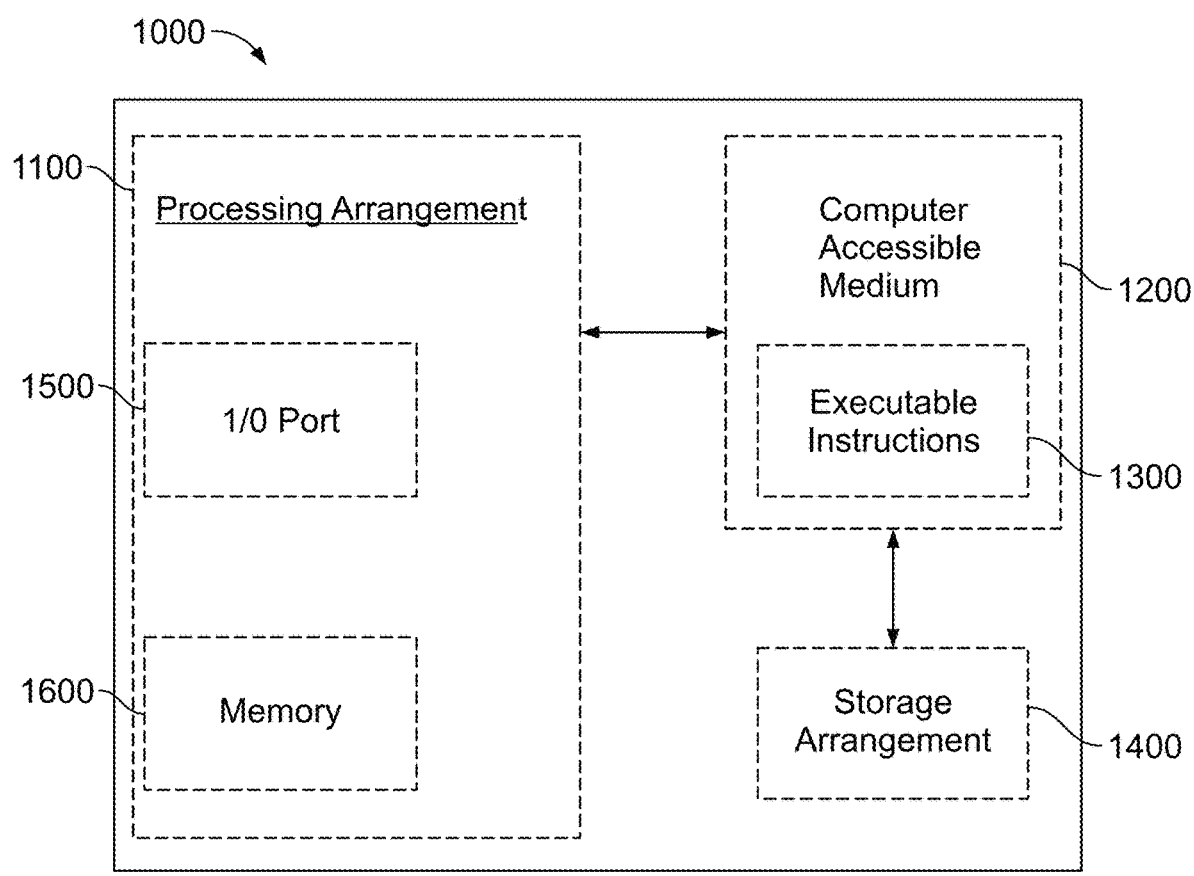
FIG. 12 illustrates a computer system for use with certain implementations.

As shown in FIG. 12, e.g., a computer-accessible medium 1200 (e.g., as described herein, a storage device such as a hard disk, floppy disk, memory stick, CD-ROM, RAM, ROM, etc., or a collection thereof) can be provided (e.g., in communication with the processing arrangement 1100). The computer-accessible medium 1200 may be a non-transitory computer-accessible medium. The computer-accessible medium 1200 can contain executable instructions 1300 thereon. In addition or alternatively, a storage arrangement 1400 can be provided separately from the computer-accessible medium 1200, which can provide the instructions to the processing arrangement 1100 so as to configure the processing arrangement to execute certain exemplary procedures, processes and methods, as described herein, for example. The instructions may include a plurality of sets of instructions. For example, in some implementations, the instructions may include instructions for applying radio frequency energy in a plurality of sequence blocks to a volume, where each of the sequence blocks includes at least a first stage. The instructions may further include instructions for repeating the first stage successively until magnetization at a beginning of each of the sequence blocks is stable, instructions for concatenating a plurality of imaging segments, which correspond to the plurality of sequence blocks, into a single continuous imaging segment, and instructions for encoding at least one relaxation parameter into the single continuous imaging segment.

System 1000 may also include a display or output device, an input device such as a key-board, mouse, touch screen or other input device, and may be connected to additional systems via a logical network. Many of the embodiments described herein may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art can appreciate that such network computing environments can typically encompass many types of computer system configurations, including personal computers, hand-held devices, multi-processor systems, microprocessor-based or programmable consumer electronics, network PCs, minicomputers, mainframe computers, and the like. Embodiments of the invention may also be practiced in distributed computing environments where tasks are performed by local and remote processing devices that are linked (either by hard-wired links, wireless links, or by a combination of hardwired or wireless links) through a communications network. In a distributed computing environment, program modules may be located in both local and remote memory storage devices.

Various embodiments are described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module," as used herein and in the claims, are intended to encompass implementations using one or more lines of software code, and/or hardware implementations, and/or equipment for receiving manual inputs.

As used herein, the singular forms "a", "an" and "the" include plural referents unless the context clearly dictates otherwise. Thus, for example, the term "a member" is intended to mean a single member or a combination of members, "a material" is intended to mean one or more materials, or a combination thereof.

As used herein, the terms "about" and "approximately" generally mean plus or minus 10% of the stated value. For example, about 0.5 would include 0.45 and 0.55, about 10 would include 9 to 11, about 1000 would include 900 to 1100.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A system for simulating an oral cavity comprising:
   a dominant hand haptic interface;
   a dominant hand grip operably connected with the dominant hand haptic interface;
   a dental instrument configured to engage the dominant hand grip;
   a finger support device; and
   a visual interface in communication with the dominant hand interface and configured to display a simulation based upon interactions with the dominant hand haptic interface.

2. The system of claim 1, further comprising a non-dominant hand haptic interface which is in communication with the visual interface.

3. The system of claim 2, a non-dominant hand dental instrument associated with the non-dominant hand haptic interface.

4. The system of claim 3, wherein the non-dominant hand dental instrument comprises a mirror instrument.

5. The system of claim 1, wherein the finger support device further includes a finger support end effector.

6. The system of claim 5, wherein the finger support end effector comprises a replica of one or more teeth.

7. The system of claim 1, wherein the dominant hand grip includes one or more haptic feedback actuators.

8. The system of claim 7, wherein the dominant hand grip includes one or more sensors, including a pressure sensor.

9. A system for simulating an oral cavity comprising:
a dominant hand haptic interface;
a dominant hand grip operably connected with the dominant hand haptic interface;
a non-dominant hand haptic interface;
a non-dominant hand grip operably connected with the non-dominant hand haptic interface;
a finger support device; and
a visual interface in communication with the dominant hand haptic interface and configured to display a simulation based upon interactions with the dominant hand haptic interface.

10. The system of claim 9, further comprising a dominant hand dental instrument configured to engage the dominant hand grip.

11. The system of claim 9, further comprising a non-dominant hand dental instrument associated with the non-dominant hand haptic interface.

12. The system of claim 11, wherein the non-dominant hand dental instrument comprises a mirror instrument.

13. The system of claim 9, wherein the finger support device further includes a finger support end effector.

14. The system of claim 13, wherein the finger support end effector comprises a replica of one or more teeth.

15. The system of claim 9, wherein the dominant hand grip includes one or more haptic feedback actuators.

16. The system of claim 15, wherein the dominant hand grip includes one or more sensors, including a pressure sensor.

17. A computer system for simulating an oral cavity comprising a dominant hand haptic interface;
a dominant hand grip operably connected with the dominant hand haptic interface;
a dental instrument configured to engage the dominant hand grip;
a finger support device associated with the dominant hand grip;
an visual interface in communication with the dominant hand interface and configure to display a simulation based upon interactions with the dominant hand haptic interface; and
a computer system in communication with the visual interface and the dominant hand haptic interface, the computer system comprising:
a processor; and
a tangible, nontransitory computer-readable medium operatively connected to the processor and including computer code configured to:
simulate an oral cavity.

18. The computer system of claim 17, wherein the dominant hand grip includes one or more haptic actuators and further wherein the computer code of the tangible, nontransitory computer-readable medium is further configured to actuate the one or more haptic actuators.

19. The computer system of claim 17, further comprising a non-dominant hand grip includes one or more haptic actuators and a non-dominant hand dental instrument configured to engage the dominant hand grip.

20. The computer system of claim 17, wherein finger support device includes two or more servo motors for controlling positioning of the finger support device within a plane and further wherein the computer code of the tangible, nontransitory computer-readable medium is further configured to control the two or more servo motors.

* * * * *